April 1, 1969   J. H. DE CLAIRE ET AL   3,436,049

BREAKAWAY MIRROR SUPPORT

Filed May 29, 1967

INVENTORS
James H. DeClaire,
LaVerne B. Ragsdale, &
Raymond G. Sprecher
E. J. Bishop
ATTORNEY

United States Patent Office 3,436,049
Patented Apr. 1, 1969

3,436,049
BREAKAWAY MIRROR SUPPORT
James H. de Claire, East Detroit, La Verne B. Ragsdale, Birmingham, and Raymond G. Sprecher, Detroit, Mich., assignors to General Motors Corporation, Detroit, Mich., a corporation of Delaware
Filed May 29, 1967, Ser. No. 641,958
Int. Cl. B60r 1/04
U.S. Cl. 248—479                4 Claims

ABSTRACT OF THE DISCLOSURE

A rear view mirror support bracket wherein the mirror support arm is connected to the mounting base by laterally spaced vertically extending shear sections and a horizontally extending web section, all of which are designed to fracture under predetermined loading conditions. The support arm is hinged by a metal strap to the mounting base after fracture and the fractured sections are sheathed by a resilient covering to prevent frontal exposure of sharp or jagged edges.

---

Recently, legislation has been enacted requiring interior rear view mirror mountings to conform to certain standards when installed in vehicles. In addition to requiring that the mirror be securely mounted and provide for horizontal and vertical adjustment of the mirror position, the mirror mounting must break away, deflect, or collapse when subjected to a given loading applied in various planes and, if a breakaway mounting is used, the resulting fracture must not leave sharp or jagged edges exposed. Thus, three requirements must be met by a breakaway mirror support: Stable mounting, separation of the support arm from a mounting portion under specific loading conditions, and projection free fracturing.

A mirror support made in accordance with the present invention satisfies these requirements by providing a plurality of sections connecting the support arm to the mounting base that fracture upon application of frontal force to the support arm. These sections, established by vertical slots formed at the juncture of the mounting base and the support arm, define shear sections at the lower edges of the juncture and a web section that extends horizontally adjacent the tips of the slots. By providing vertically and horizontally orientated fracture sections, the mirror support arm can be designed to "break away" at predetermined loads despite multi-directional applications of force. To guard against the possibility of secondary impacting by the support arm after separation from the mounting base, a strap member is fixed to the underside of the bracket so that the support arm is hinged to the mounting base after fracturing. A vinyl sheath covers the fractured sections and prevents a frontal exposure of sharp or jagged edges.

Accordingly, the objects of the present invention are: to provide a mirror support that will fracture when subjected to predetermined force without leaving sharp or jagged edges exposed; to provide a mirror support wherein a support arm is designed to separate from the mounting base under predetermined loading conditions and is hinged by a strap member to the mounting base after separation; to provide a mirror support bracket wherein a support arm, connected to a mounting base by laterally spaced vertically extending shear sections and a horizontally extending web section, is designed to fracture under predetermined loading conditions, and is hinged to the mounting base after fracture by a strap fixed to the underside of the support bracket; and to provide a breakaway mirror support wherein a resilient sheath, secured to the support bracket, frontally covers the fractured sections and prevents exposure of sharp or jagged edges.

Figure 1:
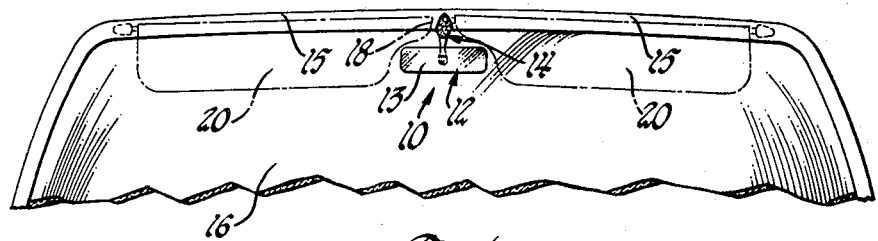
Figure 2:
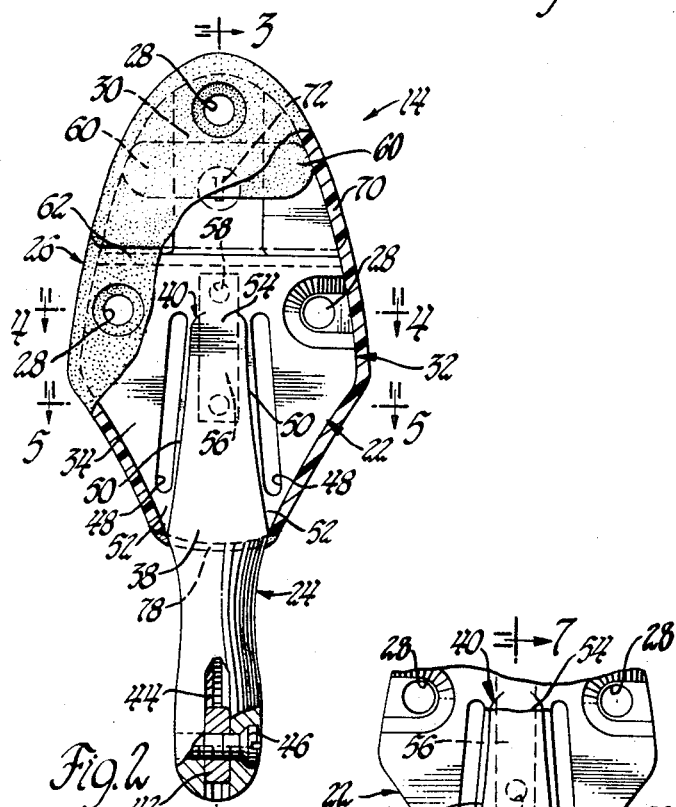
Figure 3:
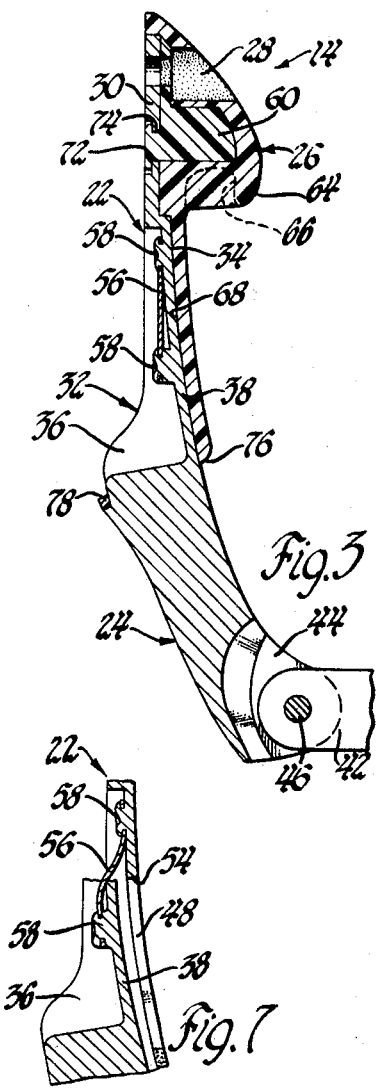
Figures 4, 6, 7:
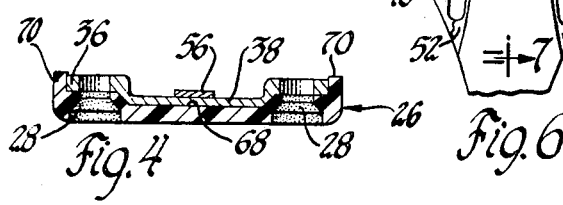
Figure 5:
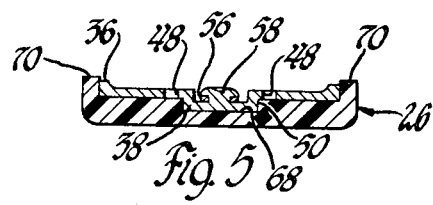

These and other objects become apparent to one skilled in the art upon reading the following detailed description, reference being made to the accompanying drawings in which:

FIGURE 1 is a front view of a mirror support bracket made in accordance with the present invention attached to the interior of a vehicle;
FIGURE 2 is a front view of the support bracket;
FIGURE 3 is a sectional view taken along line 3—3 in FIGURE 2;
FIGURE 4 is a sectional view taken along line 4—4 of FIGURE 2;
FIGURE 5 is a sectional view taken along line 5—5 of FIGURE 2;
FIGURE 6 is a partial front view of the support bracket shown in FIGURE 2 after fracture; and
FIGURE 7 is a sectional view taken along line 7—7 of FIGURE 6.

As shown in FIGURE 1, the rear view mirror assembly 10, made in accordance with the present invention, includes a conventional mirror element 12 having a forwardly facing reflecting surface 13 and a support bracket 14 attached to the molding 15 adjacent the windshield 16 and adapted to support the inboard ends 18 of the sun visors 20. The support bracket 14 generally comprises a mounting base 22, a support arm 24, and a resilient covering 26 and, as shown in FIGURES 2 and 4, has suitable apertures 28 formed therein to permit attachment to the windshield molding 15 by bolts or screws, not shown.

The mounting base 22 comprises a vertically extending and substantially flat upper arm 30 and a diamond shaped base portion 32 having a thin section front plate 34 and a rearwardly extending rim 36 extending around its outer periphery that provides sufficient stiffness for a stable and vibration-free mounting. The support arm 24 extends generally downwardly from the mounting base 22 and has a neck portion 38 integrally formed with the front plate 34 at a generally inverted U-shaped frontal juncture 40. Preferably, the mounting base 22 and the support arm 24 are a zinc die casting.

As seen in FIGURE 3, a rearwardly extending mounting arm 42 of the mirror element 12 is located in a forwardly opening groove 44 formed in the lower end of the support arm 24, and is pivotally and frictionally retained therein by means of an adjustable screw 46. A pair of laterally spaced vertically extending slots 48 are formed adjacent the vertical edges 50 of the juncture 40, and define a pair of laterally spaced vertically extending shear sections 52 at the root portion and a horizontally extending web section 54 adjacent the top of the neck portion 38.

As shown in FIGURES 6 and 7, the slots 48, shear sections 52, and web section 54 are designed to fracture upon application of a predetermined load in a direction within a given area. It should be noted that a flash material may be present in the slots 48 after the die casting of the support bracket 14. As long as the thickness of the flash material is relatively thin, its removal is not necessary inasmuch as the fracturing characteristics of the bracket 14 will not be significantly altered. A metal strap member 56 is secured to the rear surface of the front plate 34 and the neck portion 38 at points 58 vertically above and below the web section 54 by staking, spot welding or other suitable methods. When the support bracket 14 is fractured, the strap member 56 acts as a hinge to prevent separation of the support arm 24 from the mounting base 22.

The covering 26 includes a relatively rigid plastic insert member 60 and a soft vinyl covering 62. The insert 60 is integrally molded with the covering 62 and appropriately formed to provide sufficient rigidity at the head portion 64 so that the inboard ends 18 of the sun visors 20 are securely retained within laterally spaced hooked cavities 66. The rear surface 68 of the covering 62 is molded to conform to the frontal contour of the support bracket 14 and has a locating ledge 70 that encircles the outer edges of the base portion 22. A rearwardly extending rectangular projection 72, inserted through an aperture 74 formed in upper portion 30, is heat staked to secure the head portion 64. The covering 26 extends downwardly over the neck portion 38 covering the slots 48, shear sections 52, and web section 54, and is secured at the lower edge 76 by a thin collar 78 that encircles the support arm 24. It will be noted that the covering 26 completely covers the fracturable sections and is intended to prevent the contacting of any sharp or jagged edges during impacting and, as shown in FIGURES 6 and 7, the strap 56 hinges the support arm 24 to the base portion 22 after fracture and prevents a secondary impacting by the support arm 24.

What is claimed is:

1. A vehicle rear view mirror assembly comprising a mounting base adapted to be attached to the interior of the vehicle, a lower portion of the mounting base formed integrally with the upper end of a downwardly depending support arm, said mounting base and said support arm being joined at a generally U-shaped juncture, laterally spaced vertically extending slots formed adjacent the juncture and defining two laterally spaced vertically extending shear sections and a horizontally extending web section, a strap member connecting the support arm and the mounting base, a resilient member connected to the mounting base and frontally covering the shear sections and web section, a mirror element having a forwardly facing reflecting surface, and a means connecting the mirror element to the lower end of the support arm.

2. A vehicle rear view mirror assembly comprising a mounting base adapted to be attached to the interior of the vehicle, a downwardly depending support arm connected to the mounting base by a pair of laterally spaced vertically extending shear sections and a horizontally extending web section, a strap member interconnecting the mounting base and the support arm, a resilient covering connected to the mounting base and the support arm and frontally covering the shear sections and the web section, and a mirror element adjustably connected to the lower portion of the support arm.

3. A vehicle rear view mirror assembly comprising a mounting base adapted to be attached to the interior of a vehicle, a support arm having an upper neck portion formed integrally with the lower portion of the mounting base at a downwardly opening generally U-shaped frontal juncture and extending substantially downwardly therefrom, laterally spaced vertically oriented slots formed adjacent the juncture, said slots defining laterally spaced vertically extending shear sections and a horizontally extending web section, a strap member connected to the mounting base at a first point and to the support arm at a second point, a mirror element adjustably connected to a lower end of the support arm, and a resilient covering connected to the mounting base and frontally covering the mounting base and the neck portion of the support arm including the shear sections and the web section.

4. A rear view mirror assembly comprising a mounting base adapted to be attached to the interior of the vehicle, a support arm depending downwardly from the mounting base and integrally connected thereto by a pair of laterally spaced vertically extending shear sections and a horizontally extending section, a strap member connected to the rear surface of the mounting base at a first point and to the rear surface of the support arm at a second point, said first point located vertically above the web section and said second point located vertically below the web section, a mirror element having a forwardly facing reflecting surface rearwardly adjustably connected to a lower portion of the support arm, and a resilient covering secured to the mounting base and frontally covering the base section and the upper end of the support arm including the web section and shear sections.

References Cited

UNITED STATES PATENTS 2,860,545  11/1958  Herr et al. _____ 248—478

ROY D. FRAZIER *Primary Examiner.*

F. DOMOTOR, *Assistant Examiner.*